(No Model.)
F. H. MASON.
PNEUMATIC TIRE.
No. 503,724. Patented Aug. 22, 1893.
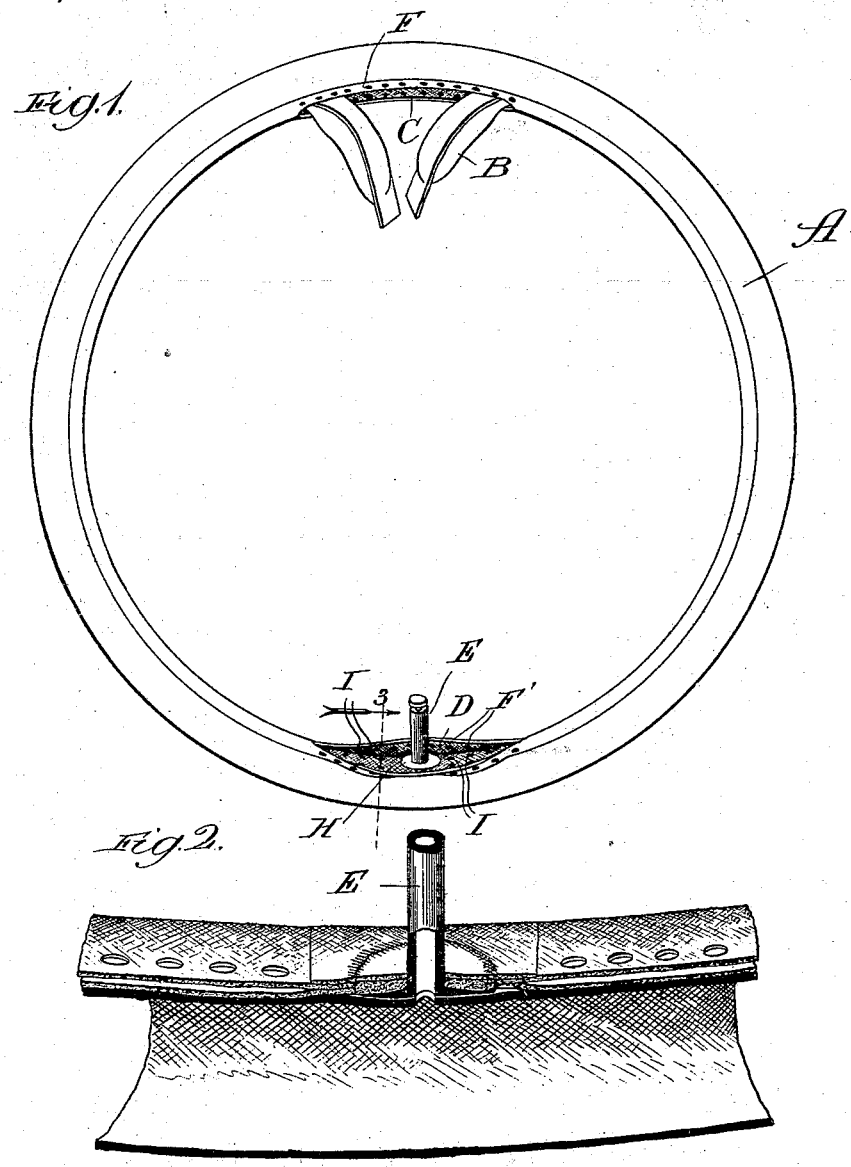

UNITED STATES PATENT OFFICE.

FRANK. H. MASON, OF AKRON, OHIO.

PNEUMATIC TIRE.

SPECIFICATION forming part of Letters Patent No. 503,724, dated August 22, 1893.

Application filed February 28, 1893. Serial No. 464,020. (No model.)

*To all whom it may concern:*

Be it known that I, FRANK. H. MASON, a citizen of the United States, residing at Akron, in the county of Cuyahoga and State of Ohio, have invented a new and useful Improvement in Bicycle and similar Tubing, of which the following is a specification.

My invention relates to an improvement in tubing more particularly of the kind employed on a pneumatic tire for bicycles, and the object of my invention is to overcome certain defects which are found to exist in such devices as they have heretofore been manufactured.

Pneumatic tires for bicycles are very commonly made of two concentric tubes, the inner one of thin rubber, being the air containing tube, while the outer one constitutes an envelope through the medium of which the inner tube is held to the felly and which serves also to protect the inner tube when in use on a wheel. A very common mode of producing the tire involving such concentric tubes is to form the inner tube in a straight or annular length and to wrap or increase it in a tubing of rubber or rubber and canvas wound spirally about it or made in a straight or annular flat or partial tubular form. Where a partial tubular form or a flat strip is employed for the envelope it is usual to lace the flaps together on what is called the seating portion or felly side, the inner air tube having previously been introduced. The invention covered by the Letters Patent No. 490,035, granted January 17, 1893, to F. W. Morgan and R. Wright, relates to an improvement in this class of manufacture which involves the formation of the outer envelope by making a continuous tube upon a mandrel, a section of which may be removed, thereupon to cut the tube for a limited distance where the removed section of the mandrel is located, remove the section and withdraw the mandrel. The inner tube, which is made in a length, the ends of which are adapted to overlap each other, and one end of which carries the air valve, is then introduced through the slit, the slit being thereupon laced together. In practicing the invention which the said patent describes it is found that the inner tube in use moves with relation to the outer envelope, or as it is termed "creeps" within the envelope, and as the tube carries the air valve the result is that a constant pressure and vibration of the rubber against the valve take place which soon results in separating one from the other. The object of my invention is to overcome this tendency, and it consists in providing upon the inner air tube adjacent to the air valve a strip of canvas or similar fabric provided with lacing holes or other means for engaging the lace employed in closing the slits formed in the outer envelope. The air tube may be introduced in the manner described in the Morgan and Wright patent above mentioned, but it is found preferable to duplicate the slit at the opposite side of the envelope, to apply the air valve to a central point in the inner tube, and to introduce the inner air tube by leading both free ends in opposite directions into the slit until they come together at the opposite slit.

The specific procedure of introducing the air tube is not herein claimed and forms no part of this invention, but as the preferred mode of construction it is used for purposes of illustration of the invention covered hereby. It is obvious that the canvas or outer strip being firmly adherent to the inner air tube will when held by engagement with the lace entirely prevent the creeping action which has been described.

In the drawings—Figure 1 is a view of a pneumatic tire constructed in accordance with my invention before the lace has been applied. Fig. 2 is a longitudinal central sectional view of a portion of the tire showing details; and Fig. 3 is a transverse section taken on the line 3 of Fig. 1.

A indicates the outer tube or envelope; B the inner air tube; C the slit formed where the free ends of the tube overlap; D the slit formed where the air valve is located.

E is the air valve; and F F' designate the perforations formed in the envelope for the reception of the lace G.

Upon the inner tube B adjacent to the air valve E there is placed a strip H of canvas, which is provided with perforations I, which when the parts are brought to the proper relation are coincident with the perforations F'. As it is desirable that the middle portion of the strip H, or that part where the perforations I are found, shall be capable of separation from the air tube to permit the lace to pass under, the strip may be secured in place either by sealing at the sides or edges, or by producing the strip in the form of a tube, as illustrated in Fig. 3, the under side of which is cemented or vulcanized or otherwise permanently secured to the inner tube, while the upper side or that carrying the perforations, is free to permit the lace to pass under it.

To construct the tire in accordance with the invention herein described the slit or slits being formed and provided with lace holes, the inner tube is introduced in such manner as to cause the perforations I in the strip H to coincide with the perforations F' in the envelope. The lace is then threaded through both sets of openings in the manner illustrated in Fig. 3, and the result is found to be that the relation of the inner tube at the point where the strip H is applied to the air tube B is practically and sufficiently unchanged.

What I claim as new, and desire to secure by Letters Patent, is—

1. The combination with the outer envelope having an opening on its seating portion and lacing means for closing said opening, of an inner tube having a strip provided with lacing means secured thereto, the lacing means in the strip and envelope being coincident, whereby the lace may be attached to both.

2. A bicycle tire, comprising, in combination, outer envelope A having a slit of limited length and provided with lace holes on the flaps of said slit, inner tube B having the tubular strip H secured by one face to the inner tube and having perforations in the other face, and lace passing through the lace holes in the flaps and strip, substantially as described.

FRANK. H. MASON.

In presence of—
M. J. FROST,
W. N. WILLIAMS.